(12) United States Patent
Pearce et al.

(10) Patent No.: US 7,283,823 B2
(45) Date of Patent: Oct. 16, 2007

(54) HANDOFF BETWEEN CELLULAR AND ENTERPRISE WIRELESS NETWORKS

(75) Inventors: Christopher E. Pearce, Dallas, TX (US); Ramanathan T. Jagadeesan, San Jose, CA (US); Bich T. Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 256 days.

(21) Appl. No.: 10/939,050

(22) Filed: Sep. 10, 2004

(65) Prior Publication Data

US 2006/0058032 A1   Mar. 16, 2006

(51) Int. Cl.
*H04Q 7/20* (2006.01)

(52) U.S. Cl. .................. 455/439; 455/414.1; 455/417

(58) Field of Classification Search ........ 455/436–440, 455/417, 552.1, 414.1
See application file for complete search history.

(56) References Cited

U.S. PATENT DOCUMENTS

| | | | |
|---|---|---|---|
| 5,454,032 A | 9/1995 | Pinard et al. | 379/182 |
| 5,850,606 A | 12/1998 | Bedingfield, Sr. et al. | 455/439 |
| 5,987,330 A | 11/1999 | Otsuji et al. | 455/462 |
| 6,125,277 A | 9/2000 | Tanaka | 455/436 |
| 6,546,425 B1 | 4/2003 | Hanson et al. | 709/227 |
| 6,647,426 B2 | 11/2003 | Mohammed | 709/238 |
| 6,665,537 B1 | 12/2003 | Lioy | 455/435 |
| 6,748,054 B1 | 6/2004 | Gross et al. | 379/88.12 |
| 6,771,953 B1 | 8/2004 | Chow et al. | 455/417 |
| 6,792,095 B1 | 9/2004 | Frank | 379/216.01 |
| 2003/0134638 A1 | 7/2003 | Sundar et al. | 455/435 |
| 2003/0134650 A1 | 7/2003 | Sundar et al. | 455/465 |
| 2003/0224795 A1 | 12/2003 | Willhoite et al. | 455/445 |
| 2004/0037324 A1 | 2/2004 | Heubel et al. | 370/493 |
| 2004/0087307 A1 | 5/2004 | Ibe et al. | 455/436 |
| 2004/0127208 A1 | 7/2004 | Nair et al. | 455/420 |
| 2004/0146021 A1 | 7/2004 | Fors et al. | 370/331 |
| 2005/0119005 A1* | 6/2005 | Segal et al. | 455/445 |
| 2005/0124326 A1* | 6/2005 | Belkin et al. | 455/414.1 |

* cited by examiner

*Primary Examiner*—Temica Beamer
(74) *Attorney, Agent, or Firm*—Baker Botts L.L.P.

(57) ABSTRACT

A mobile station includes a first wireless interface that can couple to a first wireless network, a second wireless interface that can couple to a second wireless network, and a controller. The controller can negotiate a first wireless link with the first wireless network using the first wireless interface and establish a communication session with a remote device using the first wireless link. The controller can also detect a session handoff trigger, negotiate a second wireless link with the second wireless network using the second wireless interface in response to the session handoff trigger, and invoke a private branch exchange feature to transfer the communication session from the first wireless link to the second wireless link.

36 Claims, 3 Drawing Sheets

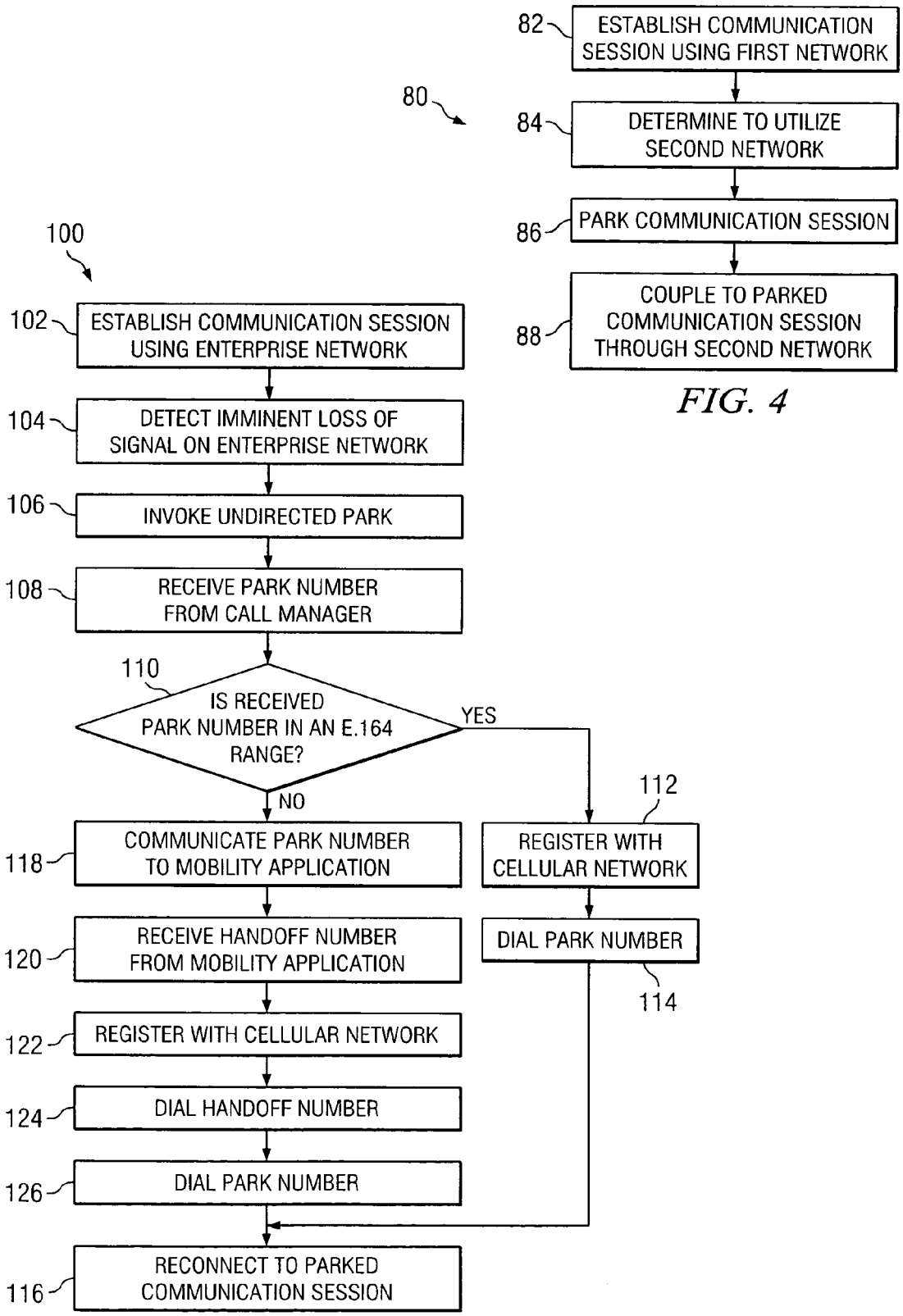

US 7,283,823 B2

HANDOFF BETWEEN CELLULAR AND ENTERPRISE WIRELESS NETWORKS

TECHNICAL FIELD OF THE INVENTION

The present invention relates generally to wireless networks, and, more particularly, to handoff between cellular and enterprise wireless networks.

BACKGROUND OF THE INVENTION

Advances in technology have resulted in the deployment of various types of wireless networks. While these wireless networks often provide service to adjacent and/or overlapping physical spaces, most cellular and enterprise network protocols are incompatible.

SUMMARY OF THE INVENTION

In accordance with the present invention, techniques for supporting handoff between cellular and enterprise wireless networks are provided. According to some embodiments, these techniques enable a mobile station to maintain a communication session that is handed between cellular and enterprise wireless networks. In particular, these techniques can enable a mobile station, alone or in combination with a mobility application, to utilize private branch exchange (PBX) functions to effect handoff from a cellular network to an enterprise network and/or handoff from an enterprise network to a cellular network.

According to a particular embodiment, a mobile station includes a first wireless interface that can couple to a first wireless network, a second wireless interface that can couple to a second wireless network, and a controller. The controller can negotiate a first wireless link with the first wireless network using the first wireless interface and establish a communication session with a remote device using the first wireless link. The controller can also detect a session handoff trigger, negotiate a second wireless link with the second wireless network using the second wireless interface in response to the session handoff trigger, and invoke a private branch exchange feature to transfer the communication session from the first wireless link to the second wireless link.

Embodiments of the invention provide various technical advantages. For example, these techniques may utilize traditional PBX features to allow a mobile station to roam between cellular and enterprise wireless networks. According to some embodiments, these techniques may reduce cost and increase performance by empowering the mobile station to select between available networks. Furthermore, by utilizing both cellular and enterprise networks, a mobile station may increase its range of use. In addition, handoff between cellular and enterprise networks may be provided with little or no change to service provider networks and/or enterprise networks. Also, these techniques may be used without modification of signal protocols and without dependence upon any existing signal protocol. Furthermore, using the disclosed techniques, trust boundaries between service providers and enterprises may be preserved.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 is a flowchart illustrating a method for effecting handoff between cellular and enterprise wireless networks;

FIG. 5 is a flowchart illustrating a method for effecting handoff between cellular and enterprise wireless networks.

DETAILED DESCRIPTION OF THE INVENTION

Figure 1:
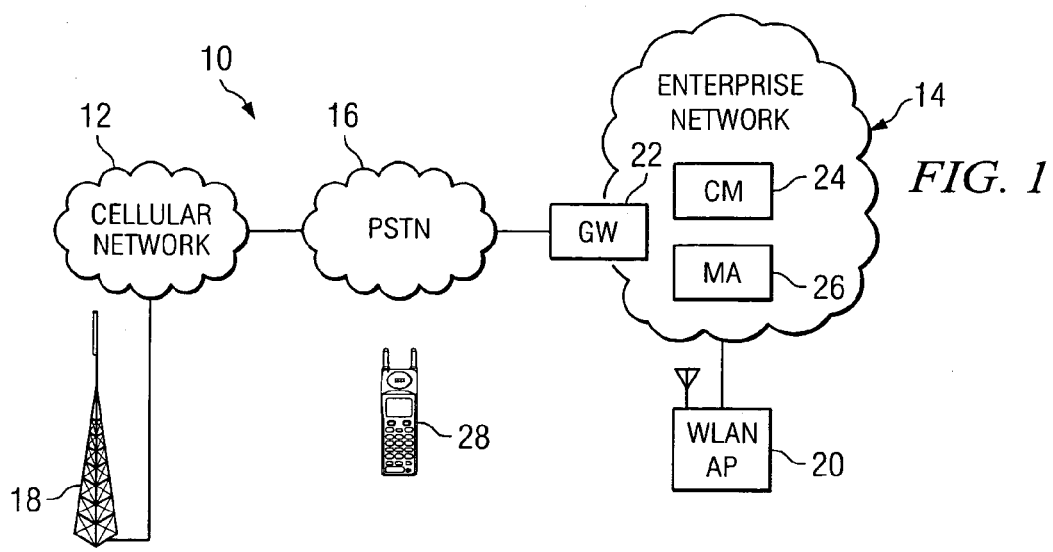
FIG. 1 illustrates a communication system having elements that support handoff between cellular and enterprise wireless networks.

FIG. 1 illustrates a communication system, indicated generally at 10, that includes a cellular network 12 and an enterprise network 14 interconnected through public switched telephone network (PSTN) 16. One or more base stations 18 couple to cellular network 12, and one or more access points 20 couple to enterprise network 14. Enterprise network 14 includes a gateway 22, a call manager 24, and a mobility application 26. System 10 also includes mobile station 28. In general, mobile station 28 may communicate with a remote device through cellular network 12 using base station 18 and/or through enterprise network 14 using access point 20. The elements of system 10 can operate to permit mobile station 28 to maintain a communication session that is handed between cellular network 12 and enterprise network 14. According to particular embodiments, mobility application 26 and/or mobile station 28 utilize one or more of various private branch exchange (PBX) functions to effect handoff between cellular network 12 and enterprise network 14.

Cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28 and PSTN 16. Thus, as illustrated, cellular network 12 may couple to base station 18 to receive and transmit wireless signals to and from mobile station 28.

Enterprise network 14 represents communications equipment, including hardware and any appropriate controlling logic, for interconnecting elements coupled to enterprise network 14. Thus, enterprise network 14 may represent a local area network (LAN), a wide area network (WAN), and/or any other appropriate form of network. Furthermore, elements within enterprise network 14 may utilize circuit-switched and/or packet-based communication protocols to provide for wireline telephony services. For example, elements within enterprise network 14 may utilize Internet Protocol (IP). In addition, elements within enterprise network 14 may utilize wireless standards such as the 802.11 family of wireless standards to provide for wireless telephony services. Note that the 802.11 family of wireless standards includes, among others, 802.11a, 802.11b, and 802.11 g. Enterprise network 14 may also utilize interactive voice response (IVR). Enterprise network 14 may include any number of wireless network devices 20, gateways 22, call managers 24, and other appropriate communications equipment for use in communicating with mobile station 28 and PSTN 16. In the embodiment illustrated, enterprise network 14 includes access point 20, gateway 22, call manager 24, and mobility application 26. Access point 20 represents communications equipment, including hardware and any appropriate controlling logic, for providing wireless access to enterprise network 14. Access point 20 may utilize one or more of the 802.11 standards. However, any appropriate wireless standard or protocol may be used.

Gateway 22 represents communications equipment, including hardware and any appropriate controlling logic, for interconnecting enterprise network 14 with cellular network 12 and/or PSTN 16. Gateway 22 may be used to convert communications between different communication protocols. For example, gateway 22 may convert communications received from cellular network 12 in SS7 protocol to any of various other protocols that may be used by enterprise network 14, such as protocols associated with the an integrated services digital network (ISDN) standard in the case of circuit-switched trunking and H.323, session initiation protocol (SIP), or other appropriate protocols in the case of IP-based trunking.

Call manager 24 represents communications equipment, including hardware and any appropriate controlling logic, for providing telephony services over enterprise network 14. For example, call manager 24 may support voice over IP (VoIP) communications, using any of various protocols such as SIP, signaling connection control point (SCCP) protocol, media gateway control protocol (MGCP), H.323, and/or any other appropriate protocol for VoIP. Furthermore, call manager 24 may act as an IP PBX and support PBX functions, such as hold, park, transfer, redirect, and/or other high level and low level call management features.

Mobility application 26 represents any suitable collection of hardware, software, and controlling logic to support handoff between cellular network 12 and enterprise network 14. For example, mobility application 26 may, when appropriate, utilize PBX features to effect handoff of a communication session between cellular network 12 and enterprise network 14.

PSTN 16 represents communications equipment, including hardware and any appropriate controlling logic, through which cellular network 12 and enterprise network 14 may communicate. PSTN 16 may include switches, wireline and wireless communication devices, and any other appropriate equipment for interconnecting cellular network 12 and enterprise network 14. PSTN 16 may include portions of public and private networks providing network transport services between various geographic areas and networks.

Mobile station 28 represents a mobile device, including hardware and any appropriate controlling logic, capable of communicating with remote devices through cellular network 12 and enterprise network 14 and maintaining communication sessions with remote devices during handoff between cellular network 12 and enterprise network 14. Mobile station 28 may communicate through cellular network 12 using base station 18 and through enterprise network 14 using access point 20. Furthermore, mobile station 28 may interact with call manager 24 and/or mobility application 26 when appropriate to utilize PBX features to effect handoff between cellular network 12 and enterprise network 14.

In operation, mobile station 28 may initiate and receive telephone calls through cellular network 12 and/or enterprise network 14 to establish communication sessions with remote devices. Note that, as used herein, a remote device refers to any communications device capable of establishing communications sessions with mobile station 28, such as devices located in cellular network 12, enterprise network 14, PSTN 16, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

When mobile station 28 is in an area serviced by cellular network 12 and/or enterprise network 14, callers who dial a telephone number or other appropriate identifier of mobile station 28 may initiate a communication session with mobile station 28 through an appropriate network. Similarly, mobile station 28 may dial a telephone number or other appropriate identifier of a remote device and initiate a communication session with the remote device through an appropriate network. Thus, mobile station 28 may function in two modes simultaneously or separately. For example, when in an area serviced by access point 20, mobile station 28 may act as an 802.11 wireless telephony device. When in an area serviced by base station 18, mobile station 28 may act as a cellular phone. These areas may or may not overlap.

Given the capability of mobile station 28 to place and receive calls through at least two networks, this presents at least four scenarios for initiation of a communication session. In a first scenario, mobile station 28 initiates a communication session by placing a call through enterprise 14 using a wireless link with access point 20. In a second scenario, mobile station 28 initiates a communication session through cellular network 12 using a wireless link with base station 18. Note that in either scenario, mobile station 28 may couple to a single remote device or to a conference call involving multiple remote devices. In a third scenario, a remote device initiates a communication session with mobile station 28, where mobile station 28 receives signaling and data through cellular network 12 using base station 18. In a fourth scenario, a remote device initiates a communication session with mobile station 28, where mobile station 28 receives signaling and data through enterprise network 14 using access point 20. Again, the communication session may be associated with a single remote device or with a conference call, and the remote device or devices may be located in cellular network 12 and/or enterprise network 14.

At any point in time, mobile station 28 may determine to handoff a communication session from cellular network 12 to enterprise network 14 or from enterprise network 14 to cellular network 12. For example, after establishing a communication session, mobile station 28 may lose or begin to lose connectivity with base station 18 or access point 20. Signal degradation may occur due to various causes. For example, mobile station 28 may begin to lose wireless connectivity due to physical movement. When possible, mobile station 28 may switch between using base station 18 and access point 20 for communications. Moreover, in certain circumstances mobile station 28 may maintain a communication session during handoff between cellular network 12 and enterprise network 14.

Handoff may occur when mobile station 28 travels from an area serviced by cellular network 12 to an area serviced by enterprise network 14. Handoff may also occur in the opposite direction, when mobile station 28 travels from an area serviced by enterprise network 14 to an area serviced by cellular network 12. However, handoff may occur at any other appropriate time. For example, handoff may occur when mobile station 28 is located in an area serviced by both network types due to a predetermined preference of one type of network, due to a spontaneous choice of a user of mobile station 28, or in response to analyzing error rates or other data associated with signaling provided by one or both types of networks. For example, error rates may be associated with signal strengths of base station 18 and access point 20, and may be dependent upon a location of mobile station 28.

In general, mobile station 28 and/or mobility application 26 may utilize PBX features such as hold, park, transfer, redirect, and other high level and low level PBX functions to provide for handoff between cellular network 12 and enterprise network 14. Mobile station 28 may couple to call manager 24 or mobility application 26 through parallel call legs through two networks. The PBX feature may be used to terminate use of an old call leg and initiate use of a new call leg to effect handoff of a communication session from the old call leg to the new call leg.

One PBX feature that may be used to effect handoff is the park feature. The park feature may be provided in two forms, undirected park and directed park. In undirected park, when a communication session is parked, a serving system such as call manager 24 may dynamically assign a park number associated with the parked communication session and report the park number to the entity parking the communication session. In directed park, the entity parking the communication session may select a park number to be associated with the communication session to be parked. To utilize directed park, the entity parking the communication session may monitor a set of park numbers to determine an available park number to prevent simultaneous use of any of the park numbers. Both park variants may be utilized to support handoff of communication sessions.

Thus, a communication session held in either manner, directed or undirected park, may be associated with a park number. Identification of the park number associated with the held call allows access to and coupling with the held communication session. The park number may be an E.164 number, which represents a dialable telephone number. Alternatively, the park number may be any other type of number identifying a particular parked communication session. According to particular embodiments, the park number may be a an extension, which is a shortened version of an E.164 number.

The park number may be used by elements of system 10 to identify a particular communication session that has been parked. For example, mobile station 28 may receive a park number from call manager 24 or mobility application 26. Note that mobile station 28 may receive the park number at any appropriate time, such as during initiation of the communication session or after determining to utilize the second network. Thereafter, to effect handoff, mobile station 28 may place a stealth call through the second network to call manager 24 or mobility application 26. The call through the second network is labeled "stealth" out of convenience, because mobile station 28 may place the call without notifying a user of mobile station 28 and may suppress notification events such as ringing. If the park number is an E.164 number, mobile station 28 may simply dial the park number. If the park number is not an E.164 number, mobile station 28 may transform the park number into an E.164 number and then dial the E.164 number. Note that if the park number is an extension number, call manager 24 may convert the inbound number back to the extension number to identify a parked communication session. Call manager 24 and/or mobility application 26 may receive the stealth call and use a PBX feature, such as park or transfer, to couple the inbound leg to the parked communication session.

The park feature enables a communication session to be placed in a hold pool. Note that mobility application 26 and/or mobile station 28 may suppress music on hold or other indications that the park feature has been invoked. For example, when a communication session associated with a remote device is parked, music on hold may be suppressed by mobility application 26 so that the user of the remote device will not hear the music on hold. Similarly, music on hold and other notifications may be suppressed by mobile station 28 during handoff as appropriate so that a user of mobile station 28 will not hear the music on hold.

Mobility application 26 or mobile station 28 may invoke a PBX feature such as park as necessary to support handoff of a communication session. At least four embodiments of handoff using PBX features should be understood. Note that aspects of these four embodiments may be modified or combined as appropriate. Furthermore, while the discussion focuses on use of the park feature, note that any appropriate PBX feature may be utilized to accomplish handoff of a communication session. In addition, while the discussion focuses on handoff of a communication session from enterprise network 14 to cellular network 12, similar steps may be used to handoff a communication session from cellular network 12 to enterprise network 14.

According to a first embodiment, mobile station 28 invokes park by communicating an appropriate signal to call manager 24 through enterprise network 14. Call manager 24 parks the communication session in response to the signal and communicates a park number to mobile station 28. Mobile station 28 uses the park number to place a second call through cellular network 12 and recouple to call manager 24. Call manager 24 receives the second call and recouples mobile station 28 to the parked communication session. Thus, mobile station 28 may effect handoff of a communication session without assistance from mobility application 26.

According to a second embodiment, mobile station 28 invokes park by communicating an appropriate signal to call manager 24 through enterprise network 14. Call manager 24 parks the communication session in response to the signal and communicates a park number to mobile station 28. Mobile station 28 communicates the park number to mobility application 26, and mobility application 26 provides a handoff number to mobile station 28 in response to receiving the park number. Mobile station 28 dials the handoff number to couple to mobility application 26 through cellular network 12. Call manager 24 routes the incoming call to mobility application 26. Mobility application 26 receives the incoming call, retrieves the parked communication session, and bridges or otherwise couples the incoming call to the parked party. Thus, mobile station 28 may park the communication session and mobility application 26 may retrieve the parked communication session.

According to a third embodiment, mobile station 28 requests a handoff number from mobility application 26. Mobility application 26 parks the communication session on behalf of mobile station 28 and provides the handoff number to mobile station 28 in response to the request. Mobile station 28 dials the handoff number to couple to mobility application 26 through cellular network 12. Call manager 24 routes the incoming call to mobility application 26. Mobility application 26 receives the incoming call, retrieves the parked communication session, and bridges or otherwise couples the incoming call to the parked party. Thus, mobility application 26 may park the communication session immediately and retrieve the parked communication session later.

According to a fourth embodiment, mobile station 28 requests a handoff number from mobility application 26. Mobility application 26 provides the handoff number to mobile station 28 in response to the request. Mobile station 28 dials the handoff number to couple to mobility application 26 through cellular network 12. Call manager 24 routes the incoming call to mobility application 26. Mobility application 26 receives the incoming call, parks the communication session, retrieves the parked communication session, and bridges or otherwise couples the incoming call to the parked party. Thus, mobility application 26 may defer parking the communication session and retrieve the parked communication session just after parking it.

Consider mobile station 28 having a call established through access point 20 and enterprise network 14 to a remote device. Any of the four embodiments discussed above or a combination or modification of the embodiments may be used to effect handoff of the call. The call includes at least two call legs, a first leg between mobile station 28 and enterprise network 14, and a second leg between enterprise network 14 and the remote device. Mobile station 28 may determine to utilize cellular network 12. For example, when exiting an area serviced by access point 20, mobile station 28 may detect a session handoff trigger such as a degradation in quality of communications through the first leg. In response to this or another session handoff trigger, mobile station 28 or mobility application 26 may use the park feature to park the call. For example, mobile station 28 may park the second call leg with call manager 24. As another example, mobile station 28 may request that mobility application 26 park the second call leg. This action may be called the park operation. Note that the first call leg may be dropped at any appropriate time. However, according to particular embodiments, the fist call leg is maintained as long as the call has not been parked. Furthermore, according to particular embodiments, the first call leg may be maintained until a new call leg is created.

Mobile station 28 and/or mobility application 26 may utilize base station 18 to create a new call leg through cellular network 12 to call manager 24 or mobility application 26. For example, mobile station 28 may dial a telephone number associated with mobility application 26. As another example, mobility application 26 may dial a telephone number associated with mobile station 28. After creating the new call leg, the park feature may then be used to couple the new call leg to the parked call. In other words, the new call leg may be coupled to the second call leg to allow mobile station 28 to resume communications with the remote device. This action may be called the park retrieval operation.

In some embodiments, anchoring a communication session in enterprise network 14 may provide for control of the communication session during handoff. Anchoring a communication session in enterprise network 14 represents routing signaling through enterprise network 14. When signaling and data flow to mobile station 28 through base station 18, anchoring the communication session in enterprise network 14 may be particularly useful, since enterprise network 14 might otherwise be excluded from the signaling path. If enterprise network 14 is excluded from the signaling path, mobility application 26 and call manager 24 cannot process handoff of the communication session.

Various methods may be used to anchor a communication session in enterprise network 14. Calls placed to mobile station 28 may be anchored in enterprise network 14. For example, cellular network 12 may be provisioned to route calls directed to the telephone number of mobile station 28 to enterprise network 14. Furthermore, mobility application 26 may control the cellular number associated with mobile station 28. Mobility application 26 may indicate to cellular network 12 when mobile station 28 is registered with enterprise network 14 so that when calls are made to the telephone number, cellular network 12 will obtain a handoff number associated with enterprise network 14 from mobility application 26. In addition, a separate enterprise telephone number may be associated with mobile station 28 so that calls to the separate enterprise telephone number will route through enterprise network 14, which can extend the call to mobile station 28 through cellular network 12.

After receiving a telephone call intended for mobile station 28, call manager 24 and/or mobility application 26 may include itself in a signaling path associated with the resulting communication session, whether the signaling path proceeds through cellular network 12 or enterprise network 14. Note that when a remote device exists outside enterprise network 14, for example on cellular network 12, and mobile station 28 is outside of a coverage area of access point 20, hairpinning media through gateway 22 may be appropriate. That is, media communicated to gateway 22 from the remote device may be routed to mobile station 28 without requiring the media to pass through enterprise network 14. Similarly, media communicated to gateway 22 from mobile station 28 may be routed to the remote device without requiring the media to pass through enterprise network 14.

Calls placed by mobile station 28 may be anchored in enterprise network 14 by first seeking to utilize enterprise network 14 when a user of mobile station 28 dials a telephone number. To the extent mobile station 28 is in an area serviced by access point 20, any communication session may be anchored in enterprise network 14 by utilizing access point 20. When mobile station 28 is located outside the area serviced by access point 20, mobile station 28 may first couple to mobility application 26 through cellular network 12. For example, cellular network 12 may be provisioned to redirect calls into enterprise network 14. Mobility application 26 may then couple mobile station 28 to the intended remote device by dialing the phone number on behalf of mobile station 28. Alternatively or in addition, mobile station 28 may dial an IVR service provided by enterprise network 14. A user of mobile station 28 may then use the IVR service to dial the target number.

Anchoring a call in enterprise network 14 may allow mobile station 28 alone or in combination with mobility application 26 to invoke PBX features within enterprise network 14, such as PBX features controlled by call manager 24, to effect handoff between enterprise network 14 and cellular network 12. For example, consider the case in which a caller in PSTN 16 calls mobile station 28 while mobile station 28 is an area serviced by base station 18. In this case, if the phone number of mobile station 28 is associated with enterprise network 14, call signaling travels through PSTN 16 and enters enterprise network 14 through gateway 22. Gateway 22, alone or in combination with call manager 24 and/or mobility application 26, extends the call back through PSTN 16 and cellular network 12 to mobile station 28. Using appropriate communications, mobile station 28 or mobility application 26 may invoke a PBX feature when appropriate to effect handoff from cellular network 12 to enterprise network 14. For example, if mobile station 28 enters or is located in an area serviced by access point 20, and mobile station 28 desires to utilize enterprise network 14, steps may be taken to effect handoff from cellular network 12 to enterprise network 14 using a PBX feature hosted by enterprise network 14. According to a particular embodiment, dial tone multifrequency (DTMF) signals may be communicated to mobility application 26 or call manager 24 to invoke a PBX feature.

As discussed above, one PBX feature that may be utilized to effect handoff is the park feature. Of course, other PBX features may be utilized. For example, the PBX feature transfer may be used to link together an existing call leg with a new call leg. For example, a new call leg associated with mobile station 28 may be transferred to a call leg associated with a remote device to reestablish a communication session. Similarly, a call leg associated with a remote device may be transferred to a new call leg associated with mobile station 28 to reestablish a communication session.

To activate a PBX feature, mobile station 28 may use any appropriate signaling. When mobile station 28 is receiving wireless service from access point 20, mobile station 28 may communicate signals to enterprise network 14 to invoke the PBX feature. For example, when leaving an area serviced by access point 20, mobile station 28 may invoke the PBX feature or request that mobility application 26 invoke the PBX feature and/or provide mobile station 28 with a handoff number. For example, the park operation may be invoked. As another example, when mobile station 28 enters an area service by access point 20, mobile station 28 may invoke the PBX feature in the same way. For example, the park retrieval operation may be invoked.

When mobile station 28 is receiving wireless service from base station 18, mobile station 28 may communicate the signals to enterprise network 14 through cellular network 12 to invoke the PBX feature. According to particular embodiments a signal may be communicated through cellular network 12 using IVR or DTMF. Within enterprise network 14, the signals may activate a PBX feature. For example, when mobile station 28 determines that enterprise network 14 may be available, mobile station 28 may communicate a sequence of signals corresponding to a feature activation code through cellular network 12.

Thus, mobile station 28 and/or mobility application 26 may take action to hand off communication sessions between cellular network 12 and enterprise network 14 with little or no changes to other elements of system 10.

Note that communication system 10 represents one embodiment of a system that supports handoff between cellular and enterprise wireless networks. Various alternative embodiments are possible. For example, while in the illustrated embodiment enterprise network 14 couples to cellular network 12 through PSTN 16 using gateway 22, various other embodiments may include enterprise network 14 coupling to cellular network 12 in other ways. For example, enterprise network 14 may couple to cellular network 12 using a service provider that supports VoIP. Thus, in alternative embodiments, cellular network 12 and gateway 22 may not be included in communication system 10.

Figure 2:
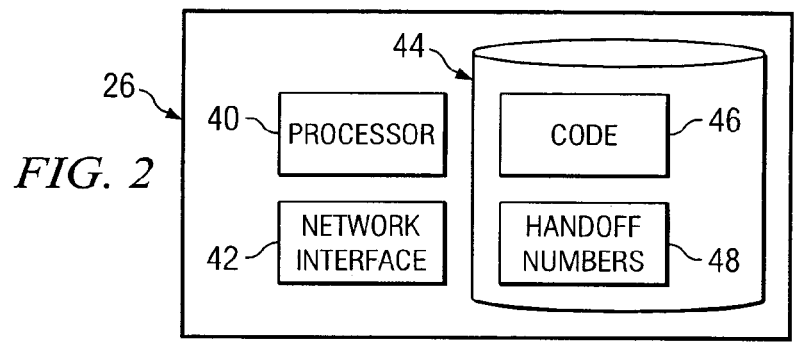
FIG. 2 is a block diagram illustrating functional components of a mobility application from the communication system.

FIG. 2 is a block diagram illustrating functional components of mobility application 26. In the embodiment illustrated, mobility application 26 includes a processor 40, a network interface 42, and a memory 44. These functional elements can operate to support handoff of active communication sessions when mobile station 28 roams between cellular network 12 and enterprise network 14.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, and/or any other suitable processing device.

Network interface 42 communicates information to and receives information from devices coupled to enterprise network 14. For example, network interface 42 may communicate with gateway 22, call manager 24, and access point 20. Furthermore, network interface 42 may receive information from and transmit information to remote devices as well as mobile station 28. Thus, network interface 42 includes any suitable hardware or controlling logic used to communicate information to or from elements coupled to mobility application 26.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46 and handoff numbers 48.

Code 46 includes software, executable files, and/or appropriate logic modules capable when executed to control the operation of mobility application 26. For example, code 46 may include executable files capable of supporting handoff between cellular network 12 and enterprise network 14. Code 46 may include instructions to enable mobility application 26 to utilize PBX features such as park to redirect incoming call legs to parked communication sessions. Handoff numbers 48 include E.164 telephone numbers that mobility application 26 may use and/or provide to mobile station 28 for use in effecting handoff between cellular network 12 and enterprise network 14. For example, mobility application 26 may be assigned static E.164 numbers for handoff purposes.

In operation, network interface 42 may receive an indication from mobile station 28 that mobile station 28 intends to utilize a second network, for example cellular network 12. In some embodiments, processor 40 may communicate a handoff number selected from handoff numbers 48 to mobile station 28 through network interface 42. Alternatively or in addition, when mobile station 28 parks the communication session and receives a park number from call manager 24, mobility application 26 may associate the park number with a handoff number 48 selected from handoff numbers 48. However, note that while in some embodiments mobile station 28 may initiate park, mobility application 26 may initiate park in other embodiments. Network interface 42 may communicate the handoff number to mobile station 28 so that mobile station 28 may dial the handoff number.

When mobile station 28 dials the handoff number, a stealth call to enterprise network 14 is initiated. Gateway 22 or call manager 24 may direct the incoming call leg to network interface 42. Processor 40 may then couple the incoming leg to the parked leg. For example, processor 40 may invoke a PBX feature. Processor 40 may activate a park retrieval operation. Alternatively, processor 40 may invoke transfer. In some embodiments, mobility application 26 may internally bridge the parked leg to the incoming leg to retain control over communication sessions. Retaining control may enable later handoffs when appropriate. In other embodiments, mobility application 26 may redirect incoming calls to call manager 24 for coupling to a parked call.

Note that mobility application 26 may utilize session description protocol (SDP) to bridge media. Use of SDP may provide for more secure handoff by associating incoming legs with parked legs only when SDP identifiers match. Furthermore, mobility application may use any appropriate protocol to communicate with other elements of system 10. For example, mobility application 26 may utilize Java telephony application programming interface (JTAPI) to interact with call manager 24.

While this example includes specific functional components for mobility application 26, mobility application 26 may include any collection and arrangement of components, including some or all of the enumerated functional components, for supporting handoff between cellular network 12 and enterprise network 14. Moreover, mobility application 26 contemplates implementing each of the functional components using any suitable combination and arrangement of hardware and/or logic, and implementing any of the functionalities using a computer program stored on a computer-readable medium. Furthermore, mobility application 26 may be implemented as a stand-alone device, or aspects of mobility application 26 may be distributed among various devices within enterprise network 14. Alternatively, in some embodiments mobility application 26 may be incorporated into call manager 24.

Figure 3:
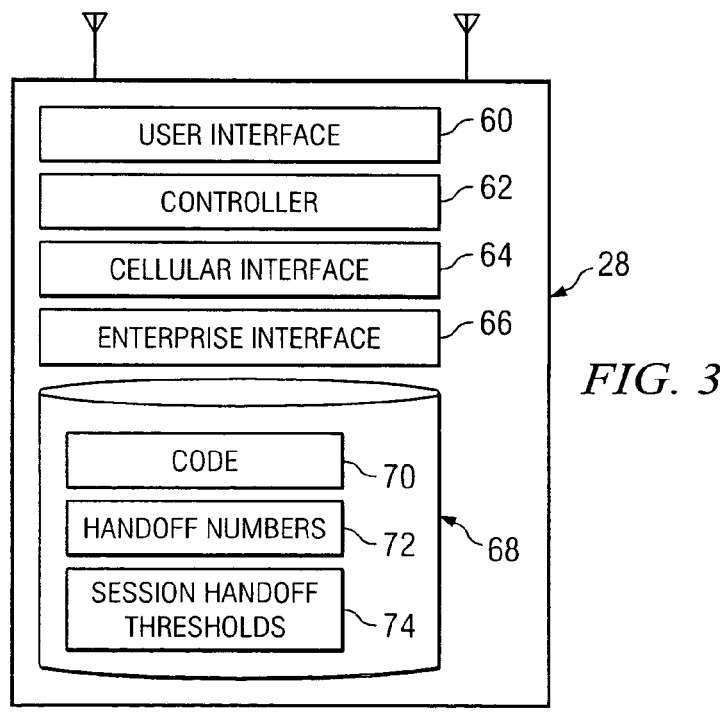
FIG. 3 is a block diagram illustrating functional components of a mobile station from the communication system.

FIG. 3 is a block diagram illustrating functional components of mobile station 28. In the embodiment illustrated, mobile station 28 includes a user interface 60, a controller 62, a cellular interface 64, an enterprise interface 66, and a memory 68. In general, mobile station 28 may establish communication sessions with remote devices through interaction with cellular network 12 and/or enterprise network 14. Moreover, mobile station 28 may effect handoff between cellular network 12 and enterprise network 14.

User interface 60 allows a user of mobile station 28 to input information into mobile station 28 and receive information outputted by mobile station 28. For example, user interface 60 may receive audio information from a user of mobile station 28. User interface 60 may also allow the user to dial telephone numbers and select from various features made available by mobile station 28. In addition, audio information may be outputted by user interface 60 to the user. Thus, user interface 60 may include a microphone, speaker, keypad, and/or other appropriate devices for inputting and outputting information.

Controller 62 controls the operation and administration of the elements within mobile station 28. For example, controller 62 operates to process information and/or commands received from user interface 60, cellular interface 64, enterprise interface 66, and memory 68. Controller 62 includes any hardware and/or logic elements operable to control and process information. For example, controller 62 may be a microcontroller, processor, programmable logic device, and/or any other suitable processing device.

Cellular interface 64 communicates information to and receives information from cellular network 12. For example, cellular interface 64 may communicate and receive audio information and signaling data associated with telephone calls placed through cellular network 12. Thus, cellular interface 64 includes any suitable hardware or controlling logic used to communicate information to or from elements coupled to mobile station 28.

Enterprise interface 66 communicates information to and receives information from enterprise network 14. For example, enterprise interface 66 may communicate and receive audio information and signaling data associated with telephone calls placed through enterprise network 14. Thus, enterprise interface 66 includes any suitable hardware or controlling logic used to communicate information to or from elements coupled to mobile station 28.

Note that, as illustrated, mobile station 28 includes multiple antennas. Use of multiple antennas may allow mobile station 28 to simultaneously couple to multiple wireless networks. For example, a first antenna couple to cellular interface 64 to provide for communication with cellular network 12, while a second antenna may couple to enterprise interface 66 to provide for communication with enterprise network 14. However, mobile station 28 may include any number of antennas, including one antenna, to provide for simultaneous and/or serial communications with various networks.

Memory 68 stores, either permanently or temporarily, data and other information for processing by controller 62 and communication using user interface 60, cellular interface 64, and/or enterprise interface 68. Memory 68 includes any one or a combination of volatile or nonvolatile devices suitable for storing information. For example, memory 68 may include RAM, ROM, magnetic storage devices, optical storage devices, or any other suitable information storage device or a combination of these devices. As illustrated, memory 68 may include one or more memory modules, such as code 70, handoff numbers 72, and session handoff thresholds 74.

Code 70 includes software, executable files, and/or appropriate logic modules capable when executed to control the operation of mobile station 28. For example, code 70 may include executable files capable of effecting handoff between cellular network 12 and enterprise network 14. Code 70 may include instructions to enable mobile station 28 to place stealth calls to create new call legs for handoff purposes. Code 70 may also include instruction to enable mobile station 28 to utilize PBX features such as park to handoff communication sessions from one network to another. Handoff numbers 72 include E.164 telephone numbers that mobile station 28 may use to effect handoff between cellular network 12 and enterprise network 14. For example, mobile station 28 may dial E.164 numbers to place stealth calls. Session handoff thresholds 74 include data, such as acceptable and unacceptable error rates associated with communication sessions. Session handoff thresholds 74 may be used by mobile station 28 to determine when to seek handoff between cellular network 12 and enterprise network 14. More specifically, session handoff thresholds 74 may specify thresholds for use when mobile station 28 has an active communication session.

In operation, controller 62 may maintain registration with call manager 24 when mobile station 28 is located within an area serviced by access point 20. Controller 62 may operate to communicate voice data received through user interface 60 as well as signaling data through base station 18 and/or access point 20 to cellular network 12 and/or enterprise network 14. Controller 62 may also operate to communicate voice data received through cellular interface 64 and/or enterprise interface 66 to a user of mobile station 28 through user interface 60. In addition, controller 62 may use session handoff thresholds 74 to determine when to effect handoff between cellular network 12 and enterprise network 14. For example, controller 62 may determine that an session handoff threshold 74 associated with communication session using enterprise interface 66 has been exceeded, and controller 62 may register with cellular network 12 using cellular interface 64 and place a stealth call through cellular network 12 to mobility application 26 using a handoff number 72. Furthermore, controller 62 may communicate commands to call manager 24 and/or mobility application 26 through cellular interface 64 and/or enterprise interface 66 to utilize PBX features for handoff purposes.

While this example includes specific functional components for mobile station 28, mobile station 28 may include any collection and arrangement of components, including some or all of the enumerated functional components, for communicating with remote devices using cellular network 12 and/or enterprise network 14 and effecting handoff between cellular network 12 and enterprise network 14 using PBX features. Moreover, mobile station 28 contemplates implementing each of the functional components using any suitable combination and arrangement of hardware and/or logic. Thus, in one embodiment mobile station 28 is a mobile phone. In other embodiments, mobile station 28 may be a personal digital assistant (PDA), laptop computer, or other device operable to establish communications with cellular network 12 and enterprise network 14.

FIG. 4 is a flowchart illustrating a method 80 for handing off a communication session between cellular network 12 and enterprise network 14. Mobile station 28 establishes a communication session using a first network at step 82. Note that mobile station 28 may initiate the communication session when a user of mobile station 28 dials a phone number, or mobile station 28 may establish the communication session when a user of mobile station 28 accepts an inbound call from a remote device. Also note that the first network may be either cellular network 12 or enterprise network 14. At step 84 mobile station 28 determines to utilize a second network. For example, mobile station 28 may monitor data associated with the first network until the data exceeds one of session handoff thresholds 74, which may cause mobile station 28 to determine to utilize the second network. Alternatively or in addition, mobile station 28 may determine to utilize the second network when a preferred network becomes available. For example, mobile station 28 may be programmed to utilize enterprise network 14 when enterprise network 14 is available due to reduced costs associated with use of cellular network 12.

The communication session is parked at step 86. In some embodiments, mobile station 28 acts to park the communication session. In other embodiments, mobility application 26 may park the communication. In either case, mobile station 28 may receive a park number. At step 88, mobile station 28 couples to the parked communication session through a second network. For example, when connecting to the parked communication session through cellular network 12, mobile station 28 may register with cellular network 12 and place a call through cellular network 12 to call manager 24 or mobility application 26 in enterprise network 14. For example, mobile station 28 may dial the park number if the park number is an E.164 number. Alternatively, mobile station 28 may transform the park number into a dialable E.164 number and then dial the E.164 number. In another variation, cellular network 12 may associate the park number with enterprise network 14 and couple mobile station 28 to enterprise network 14 upon mobile station 28 dialing the park number. When connecting to the parked communication session through enterprise network 14, mobile station 28 may couple to the parked communication session using access point 20. Mobile station 28 may provide the park number to reconnect to the parked communication session.

Thus, method 80 represents a simplified series of steps to effect handoff between cellular network 12 and enterprise network 14. While the PBX feature park is used in this example, as discussed above, various other PBX features may be utilized to effect handoff between cellular network 12 and enterprise network 14. As another example, the transfer feature may be used to transfer the communication session from mobile station 28 to mobility application 26, and then back to mobile station 28 so that a new call leg may be used. Thus, while the park feature has been illustrated for ease of description, various PBX features may be utilized.

FIG. 5 illustrates another method 100 for effecting handoff between cellular network 12 and enterprise network 14. Mobile station 28 establishes a communication session with a remote device using enterprise network 14 at step 102. Note that in some embodiments mobile station 28 maintains registration with call manager 24 and/or mobility application 26 while mobile station 28 remains within range of access point 20. Thus, call manager 24 may direct incoming calls intended for mobile station 28 through access point 20 when mobile station 28 is registered, and direct incoming calls intended for mobile station 28 through PSTN 16 when mobile station 28 is not registered. Similarly, a user of mobile station 28 may dial a telephone number and mobile station 28 may communicate signaling information through access point 20 to enterprise network 14 and call manager 24 when mobile station 28 has registered with call manager 24. Note that the remote device associated with the communication session may be located in enterprise network 14 or outside enterprise network 14, such as in PSTN 16 or cellular network 12.

Mobile station 28 may detect eminent loss of signal on the enterprise network 14 at step 104. For example, as discussed above, mobile station 28 may monitor data associated with enterprise network 14 and compare the data with session handoff thresholds 74. Mobile station 28 invokes undirected park at step 106. Undirected park may be invoked by a user of mobile station 28 or automatically by mobile station 28. Mobile station 28 receives a park number from call manager 24 at step 108. At step 110, mobile station 28 determines whether the received park number is in an E.164 range. If the received park number is an E.164 range, mobile station 28 registers with cellular network 12 at step 112 and dials the park number at step 114. At step 116, mobile station 28 is reconnected to the parked communication session.

Returning to step 110, if the received park number is not in an E.164 range, mobile station 28 communicates the park number to mobility application 26 at step 118. At step 120, mobile station 28 receives a handoff number from mobility application 26. The handoff number received may be a dialable number in an E.164 range so that mobile station 28 may use the handoff number to couple to mobility application 26 through cellular network 12. Thus, mobile station 28 registers with the cellular network 12 at step 122 and dials the handoff number at step 124. At step 126, mobility application 28 dials the park number on behalf of mobile station 28. At step 116, mobile station 28 is reconnected to the parked communication session.

In some embodiments, a media break may occur during handoff. However, audio notifications associated with the handoff, such as music on hold, ringing, and other indications and sounds may be suppressed by mobile station 28. Alternatively or in addition, mobile station 28 may communicate information to a user of mobile station 28 that a handoff is occurring. Furthermore, note that method 100 might involve parking the communication session before placing the stealth call. However, in some embodiments, mobile station 28 may place a stealth call before parking the communication session, and only park the communication session after detecting answer by mobility application 26. Using this sequence, the length of the media break may be reduced or eliminated.

Note that method 100 utilizes undirected park. Alternatively or in addition, directed park may be utilized. Using directed park, mobile station 28 may determine available park numbers and select one of the available park numbers for use in handoff. In some embodiments, mobile station 28 and/or particular communication sessions may be assigned specific park numbers to use when appropriate. Furthermore, mobile station 28 may be able to monitor what park numbers are being used at any time. If the selected park number is an E.164 number, when mobile station 28 determines to utilize cellular network 12, mobile station 28 may dial the park number directly. If the park number is not an E.164 number, mobile station 28 may register the park number with mobility application 26, and mobility application 26 may map the park number to an E.164 number for park retrieval.

Method 100 illustrates handoff from enterprise network 14 to cellular network 12. However, handoff from cellular network 12 to enterprise network 14 may occur using similar techniques. In some embodiments, handoff from cellular network 12 to enterprise network 14 may include use of DTMF signals communicated from mobile station 28 to cellular network 12 being converted into a feature indication when mobile station 28 enters an area serviced by access point 20. To utilize DTMF signals to invoke PBX features, communication sessions may be required to anchor in enterprise network 14. After anchoring a communication in enterprise network 14, when mobile station 28 determines that enterprise network 14 may be available, mobile station 28 may provide a sequence of DTMF signals corresponding to a feature activation code. When the DTMF signals traveling through cellular network 14 enter enterprise network 14, the DTMF signals may be converted into a feature activator in order to park the communication session. In the undirected park embodiment, a park number may be communicated via DTMF signals to mobile station 28. In the directed park embodiment, the park number may be provided along with the feature activation code. Mobile station 28 may couple to the parked communication session through a new call leg established through access point 20.

To provide for increased security, park retrievals may be required to be validated before allowing an incoming call leg to be coupled to a parked communication session. For example, an identifier of a calling party may be required to be matched to an identifier of the parking party. Furthermore, utilizing a method including mobility application 26 may allow mobility application 26 to perform a security function without altering a native park feature in call manager 24.

Figure 6:
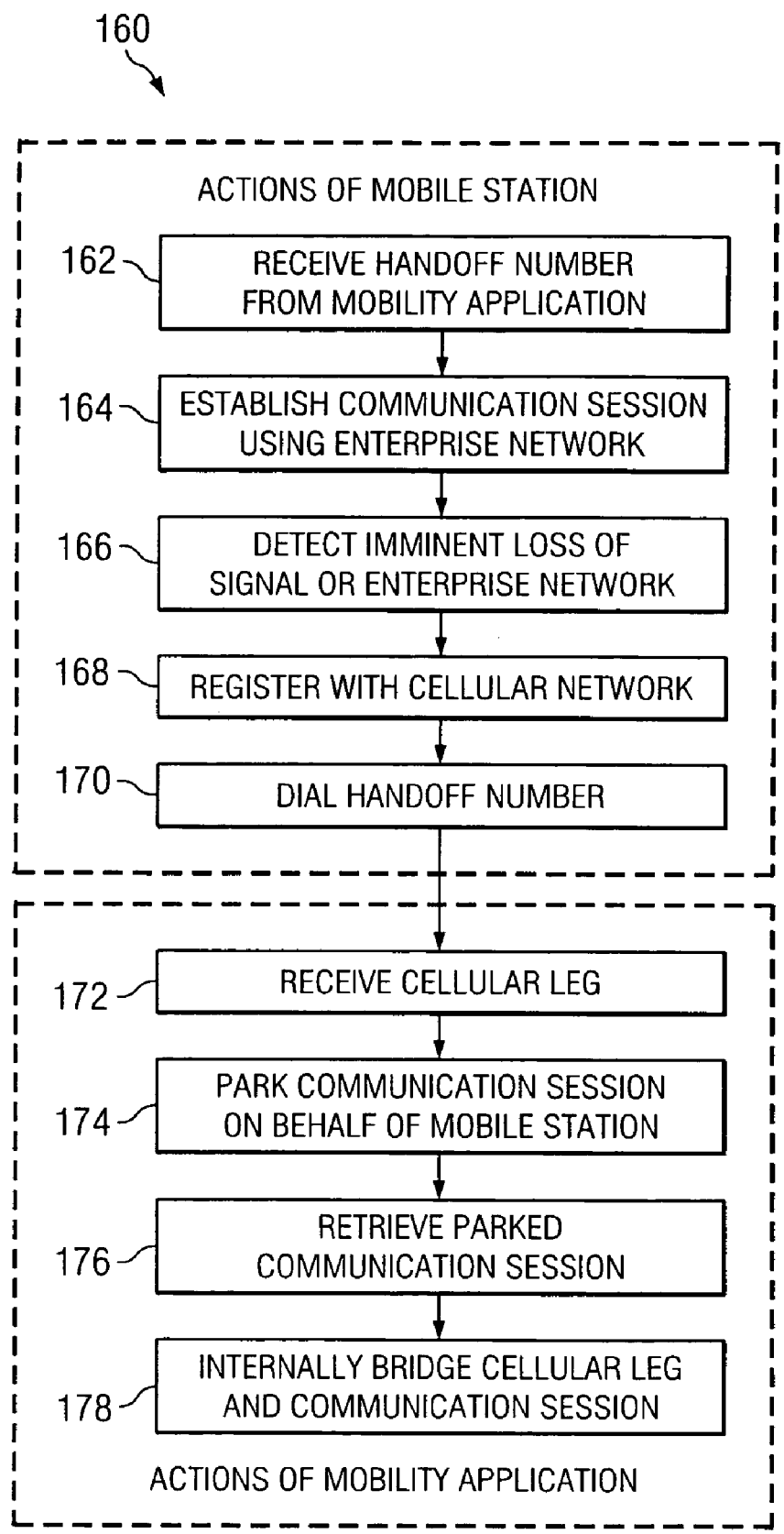
FIG. 6 is a flowchart illustrating a method for effecting handoff between cellular and enterprise wireless networks.

FIG. 6 illustrates another method 160 for effecting handoff between cellular network 12 and enterprise network 14. Note that in this embodiment, as indicated, steps 162 through 170 may be performed by mobile station 28, while steps 172 through 178 may be performed by mobility application 26. However, steps may be performed by any appropriate element of system 10.

Mobile station 28 receives a handoff number from mobility application 26 at step 162. In this example, the handoff number is a dialable E.164 number. Note that enterprise network 14 may reserve with PSTN 16 a block of E.164 numbers that enterprise network 14 may not associate with any particular end points in enterprise network 14, but which may be used specifically to serve as numbers to handle handoff between enterprise network 14 in cellular network 12. Mobile station 28 establishes a communication session using enterprise network 14 at step 164. As discussed above, to establish the communication session using enterprise network 14 mobile station 28 may initiate or receive a call while mobile station 28 is within an area serviced by access point 20. At step 166, mobile station 28 detects eminent loss of signals on enterprise network 14. For example, eminent loss of signals may be predicted by comparing error rates with error thresholds. In response to detecting eminent loss of signals, mobile station 28 registers with cellular network 12 at step 168 and dials the handoff number at step 170. Dialing the handoff number may include placing a stealth call to the handoff number targeted on mobility application 26.

Note that when exiting an area serviced by access point 20, error rates will normally increase and at some point exceed error thresholds. Mobile station 28 may be able to register with cellular network 12 and couple to the communication session using a new leg before call manager 24 detects loss of signaling with mobile station 28 and drops the original communication session. However, to prevent call manager 24 from dropping the communication session, mobile station 28 and/or mobility application 26 may set a release trigger on the communication session to prevent it from being cleared or dropped by call manager 24.

Mobility application 26 receives the call from mobile station 28, which creates a cellular call between mobility application 26 and mobile station 28, at step 172. At step 174, mobility application 26 parks the communication session on behalf of mobile station 28. For example, mobility application 26 may communicate a command to call manager 24 to park the communication session. Also, a park completion signal may be communicated to mobile station 28 through cellular network 12 and/or enterprise network 14. Mobility application 26 retrieves the parked communication session at step 176. For example, mobility application 26 may redirect the communication session to mobility application 26.

Mobility application 26 internally bridges the cellular leg and the communication session at step 178. Note that instead of internally bridging the cellular leg to the communication session, mobility application 26 may simply redirect the cellular leg to the communication session, thereby losing direct control over the communication session. However, retaining control of the communication session may better enable future handoffs by anchoring the communication session in mobility application 26.

As discussed above, use of SDP may provide for security of handoffs. For example, in some embodiments mobility application 26 may answer the call and check for the SDP of the communication session. Thereafter, mobility application 26 may place a new call to the park number, providing the SDP of the inbound call.

Thus, method 160 represents another embodiment of a method for effecting handoff between cellular network 12 and enterprise network 14. Furthermore, method 160 illustrates actions that may be taken by mobility application 26 and mobile station 28 to effect handoff of a communication session from enterprise network 14 to cellular network 12.

Note that, as discussed above, analogous methods may be used to effect handoff of a communication session from cellular network 12 to enterprise network 14.

The preceding flowcharts illustrate particular methods for effecting handoff between cellular network 12 and enterprise network 14. However, these flowcharts illustrate only exemplary methods of operation. While discussion sometimes focuses on handoff in the enterprise-to-cellular direction, similar techniques may be used to provide for handoff in the cellular-to-enterprise direction. Furthermore, communication system 10 contemplates devices using any suitable techniques, elements, and applications for performing these functions. Thus, many of the steps in the flowcharts may take place simultaneously and/or in different orders than as shown. In addition, the devices may use methods with additional steps or fewer steps, so long as the methods remain appropriate. Moreover, other devices of system 10 may perform similar techniques to support handoff between cellular network 12 and enterprise network 14.

Although the present invention has been described in several embodiments, a myriad of change and modifications may be suggested to one skilled in the art, and it is intended that the present invention encompass such changes and modifications as fall within the present appended claims.

What is claimed is:

1. A mobile station, comprising:
   a first wireless interface operable to couple to a first wireless network;
   a second wireless interface operable to couple to a second wireless network; and
   a controller operable to negotiate a first wireless link with the first wireless network using the first wireless interface, to establish a communication session with a remote device using the first wireless link, to detect a session handoff trigger, to negotiate a second wireless link with the second wireless network using the second wireless interface in response to the session handoff trigger, and to invoke a call park feature to transfer the communication session from the first wireless link to the second wireless link.

2. The mobile station of claim 1, wherein the controller is further operable to park the communication session using the call perk feature, to identify a park number associated with the park communication session, and to couple the second wireless link to the parked communication session using the identified park number.

3. The mobile station of claim 2, wherein:
   the call park feature comprises undirected park; and
   the park number comprises a dialable telephone number.

4. The mobile station of claim 1, wherein the controller is further operable to park the communication session in the first wireless network using the call park feature, to receive a park number in response to parking the communication session, to use a predetermined telephone number associated with the first wireless network to couple to the first wireless network using the second wireless link after negotiating the second wireless link, and to communicate the park number to the first wireless network to couple to the parked communication session.

5. The mobile station of claim 1, wherein the controller is further operable to monitor a quality of the first wireless link and the session handoff trigger comprises the quality dropping below a threshold.

6. The mobile station of claim 1, wherein the first wireless network comprises an enterprise network and the second wireless network comprises a cellular network.

7. The mobile station of claim 1, wherein the communication session comprises a voice conversation.

8. A system for effecting handoff between wireless networks, comprising:
   a mobile station operable to negotiate a first wireless link with a first wireless network, to establish a communication session with a remote device using the first wireless link, to detect a session handoff trigger, and to negotiate a second wireless link with the second wireless network in response to the session handoff trigger; and
   a mobility application operable to transfer the communication session from the first wireless link to the second wireless link using a call park feature.

9. The system of claim 8, wherein the mobile station is further operable to invoke the call park feature_to transfer the communication session from the first wireless link to the second wireless link.

10. The system of claim 9, wherein:
    the mobile station is further operable to park the communication session using the call park feature, to identify a park number associated with the parked communication session, to couple to the mobility application, and to transmit the park number to the mobility application; and
    the mobility application is further operable to receive the park number and to couple the second wireless link to the parked communication session using the park number.

11. The system of claim 8, wherein the mobility application is further operable to invoke the call park feature_to transfer the communication session from the first wireless link to the second wireless link.

12. The system of claim 11, wherein:
    the mobility application is further operable to park the communication session on behalf of the mobile station using the call park feature and to bridge the second wireless link to the parked communication session.

13. The system of claim 8, wherein the mobile station is further operable to monitor a quality of the first wireless link and the session handoff trigger comprises the quality dropping below a threshold.

14. The system of claim 8, wherein the first wireless network comprises an enterprise network and the second wireless network comprises a cellular network.

15. The system of claim 8, wherein the communication session comprises a voice conversation.

16. A method for effecting handoff between wireless networks, comprising:
    negotiating a first wireless link with a first wireless network;
    establishing a communication session with a remote device using the first wireless link;
    detecting a session handoff trigger;
    negotiating a second wireless link with the second wireless network in response to the session handoff trigger; and
    invoking a call park feature_to transfer the communication session from the first wireless link to the second wireless link.

17. The method of claim 16, further comprising:
    parking the communication session using the call park feature;
    identifying a park number associated with the parked communication session; and
    coupling the second wireless link to the parked communication session using the identified park number.

18. The method of claim 17, wherein:
the call park feature comprises undirected park; and
the park number comprises a dialable telephone number.

19. The method of claim 16, further comprising:
parking the communication session in the first wireless network using the call park feature;
receiving a park number in response to parking the communication session;
after negotiating the second wireless link, using a predetermined telephone number associated with the first wireless network to couple to the first wireless network using the second wireless link; and
communicating the park number to the first wireless network to couple to the parked communication session.

20. The method of claim 16, further comprising:
monitoring a quality of the first wireless link;
wherein the session handoff trigger comprises the quality dropping below a threshold.

21. The method of claim 16, wherein the first wireless network comprises an enterprise network and the second wireless network comprises a cellular network.

22. The method of claim 16, wherein the communication session comprises a voice conversation.

23. Logic for effecting handoff between wireless networks, the logic encoded in computer readable media and when executed using one or more processors operable to:
negotiate a first wireless link with a first wireless network;
establish a communication session with a remote device using the first wireless link;
detect a session handoff trigger;
negotiate a second wireless link with the second wireless network in response to the session handoff trigger; and
invoke a call park feature_to transfer the communication session from the first wireless link to the second wireless link.

24. The logic of claim 23, further operable when executed to:
park the communication session using the call park feature;
identify a park number associated with the parked communication session; and
couple the second wireless link to the parked communication session using the identified park number.

25. The logic of claim 24, wherein:
the call park feature comprises undirected park; and
the park number comprises a dialable telephone number.

26. The logic of claim 23, further operable when executed to:
park the communication session in the first wireless network using the call park feature;
receive a park number in response to parking the communication session;
after negotiating the second wireless link, use a predetermined telephone number associated with the first wireless network to couple to the first wireless network using the second wireless link; and
communicate the park number to the first wireless network to couple to the parked communication session.

27. The logic of claim 23, further operable when executed to:
monitor a quality of the first wireless link;
wherein the session handoff trigger comprises the quality dropping below a threshold.

28. The logic of claim 23, wherein the first wireless network comprises an enterprise network and the second wireless network comprises a cellular network.

29. The logic of claim 23, wherein the communication session comprises a voice conversation.

30. A system for effecting handoff between wireless networks, comprising:
means for negotiating a first wireless link with a first wireless network;
means for establishing a communication session with a remote device using the first wireless link;
means for detecting a session handoff trigger;
means for negotiating a second wireless link with the second wireless network in response to the session handoff trigger; and
means for invoking a call park feature_to transfer the communication session from the first wireless link to the second wireless link.

31. The system of claim 30, further comprising:
means for parking the communication session using the call park feature;
means for identifying a park number associated with the parked communication session; and
means for coupling the second wireless link to the parked communication session using the identified park number.

32. The system of claim 31, wherein:
the call park feature comprises undirected park; and
the park number comprises a dialable telephone number.

33. The system of claim 30, further comprising:
means for parking the communication session in the first wireless network using the call park feature;
means for receiving a park number in response to parking the communication session;
after negotiating the second wireless link, means for using a predetermined telephone number associated with the first wireless network to couple to the first wireless network using the second wireless link; and
means for communicating the park number to the first wireless network to couple to the parked communication session.

34. The system of claim 30, further comprising:
means for monitoring a quality of the first wireless link;
wherein the session handoff trigger comprises the quality dropping below a threshold.

35. The system of claim 30, wherein the first wireless network comprises an enterprise network and the second wireless network comprises a cellular network.

36. The system of claim 30, wherein the communication session comprises a voice conversation.

* * * * *